United States Patent
Madison

[11] Patent Number: 5,913,451
[45] Date of Patent: Jun. 22, 1999

[54] FUEL TANK ASSEMBLY FOR VOLATILE FUEL

[76] Inventor: Kevin Madison, 9-04 Harristown Rd., Glen Rock, N.J. 07654

[21] Appl. No.: 08/972,931

[22] Filed: Nov. 18, 1997

[51] Int. Cl.$^6$ .................................................. B65D 25/00
[52] U.S. Cl. ........................................... 220/723; 220/900
[58] Field of Search ..................................... 220/720, 723, 220/426, 562, 900, 905, 88.1, 88.2, 495.01

[56] References Cited

U.S. PATENT DOCUMENTS

| | | |
|---|---|---|
| 2,102,590 | 12/1937 | Gray et al. . |
| 2,482,366 | 9/1949 | Potters ................................ 220/900 X |
| 2,609,118 | 9/1952 | Cattaneo ................................. 220/723 |
| 2,628,673 | 2/1953 | Ericson . |
| 2,653,780 | 9/1953 | Pepersack . |
| 2,697,483 | 12/1954 | Stanley . |
| 2,798,639 | 7/1957 | Urban ..................................... 220/426 |
| 2,815,152 | 12/1957 | Mills ................................... 220/720 X |
| 3,477,611 | 11/1969 | Niles . |
| 3,534,884 | 10/1970 | Suter ..................................... 220/723 |
| 3,648,886 | 3/1972 | Pringle .................................. 220/723 |
| 3,747,800 | 7/1973 | Viland . |
| 3,752,355 | 8/1973 | Weissenbach . |
| 3,838,795 | 10/1974 | Berg . |
| 3,887,104 | 6/1975 | Cole . |
| 3,949,720 | 4/1976 | Zipprich et al. ..................... 220/723 X |
| 3,968,896 | 7/1976 | Giacoletti et al. . |
| 4,852,765 | 8/1989 | Lyzohub . |
| 4,902,304 | 2/1990 | Hallen ................................. 220/426 X |

*Primary Examiner*—Steven Pollard
*Attorney, Agent, or Firm*—Arthur Jacob

[57] ABSTRACT

A fuel tank assembly contains a supply of volatile fuel in a collapsible container having a highly compliant wall movable between an expanded configuration and a collapsed configuration so as to follow and conform closely to the supply of volatile fuel within the container as the fuel is withdrawn from and replenished in the supply, the wall having a composite construction including a fluid filler material contained within a highly flexible envelope such that the composite construction of the wall enables expansion of the container toward the expanded configuration in response to the replenishment of fuel in the container to conform to and contain the supply of volatile fuel, and enables collapse of the container in response to the withdrawal of fuel from the container, toward the collapsed configuration, with the wall continuously and closely conforming to the supply of fuel within the container as fuel is withdrawn from and replenished within the container, thereby deterring the formation of fuel vapor within the fuel tank assembly.

16 Claims, 3 Drawing Sheets

FUEL TANK ASSEMBLY FOR VOLATILE FUEL

The present invention relates generally to the storage and handling of volatile fuel and pertains, more specifically, to the construction of fuel tanks for containing volatile fuel used in connection with various vehicles, such as automotive vehicles, aircraft and watercraft.

Conventional fuel tanks for vehicles fueled with petroleum fuels usually employ rigid containers of fixed volume together with some venting system which enables ambient air to replace the volume of fuel withdrawn from the tank, or to vent air from the tank as fuel flows into the tank. The presence of air in the tank leads to the formation of fuel vapor. Fuel vapor within the tank, or in the vicinity of the tank, presents a dangerous condition in that an impact or some other event which results in a spark could cause a catastrophic explosion. Moreover, fuel vapors vented to the ambient atmosphere are harmful to the environment and such venting generally is prohibited by law. Consequently, systems have been put in place, both within the vehicles themselves and external to the vehicles, for collecting and in some way dealing with these potentially dangerous fuel vapors.

It has been suggested that a fuel tank constructed with a flexible, collapsible liner either will eliminate the formation of fuel vapor or will isolate any fuel vapor from the ambient atmosphere; however, fuel tanks having such a construction heretofore have not been successful enough to be introduced for widespread commercial use.

The present invention provides a fuel tank construction which deters the formation of fuel vapor, thereby avoiding the problems associated with dealing with fuel vapor and eliminating the need for elaborate systems for handling fuel vapors endemic to current conventional fuel tanks. To that end, the construction employs a container of variable volume, as previously suggested, but provides an improvement in the container, which improvement attains several objects and advantages, some of which are summarized as follows: Provides a fuel tank assembly with a container having a wall of highly compliant construction for deterring the formation of fuel vapor while the volume of fuel contained in the container is varied; enables greater safety through the elimination of the potential of explosion by deterring the formation of fuel vapor in vehicle fuel tanks; provides a relatively simple construction for a fuel tank which is effective in dealing with the problem of fuel vapor without prohibitive added expense; provides a fuel tank construction fully compatible with current vehicles and readily incorporated into such current vehicles for exemplary performance; enables exemplary performance over an extended service life.

The above objects and advantages, as well as further objects and advantages, are attained by the present invention which may be described briefly as a fuel tank assembly for containing a supply of volatile fuel and deterring the formation of fuel vapor within the fuel tank assembly as fuel is withdrawn from and replenished to the supply in the fuel tank assembly, the fuel tank assembly comprising: a collapsible container having a highly compliant wall movable between an expanded configuration and a collapsed configuration so as to follow and conform closely to the supply of volatile fuel within the container as the fuel is withdrawn from and replenished in the supply; the wall having a composite construction including a fluid filler material contained within a highly flexible envelope such that the composite construction of the wall enables expansion of the container toward the expanded configuration in response to the replenishment of fuel in the container to conform to and contain the supply of volatile fuel, and enables collapse of the container in response to the withdrawal of fuel from the container, toward the collapsed configuration, with the wall continuously and closely conforming to the supply of fuel within the container as fuel is withdrawn from and replenished within the container, thereby deterring the formation of fuel vapor within the fuel tank assembly.

The invention will be understood more fully, while still further objects and advantages will become apparent, in the following detailed description of a preferred embodiment of the invention illustrated in the accompanying drawing, in which.

Figure 1:
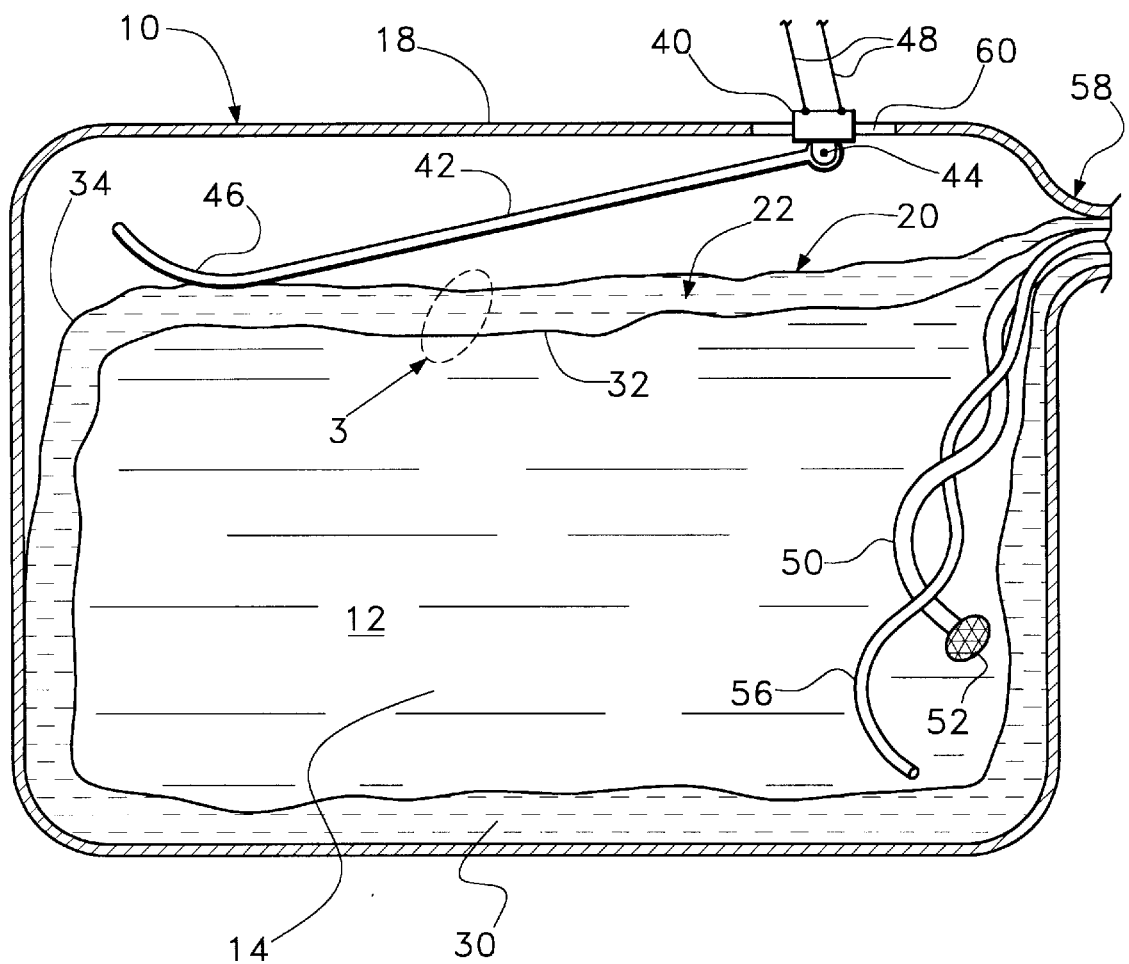
FIG. 1 is a partially diagrammatic cross-sectional view of a fuel tank assembly constructed in accordance with the present invention.
Figure 2:
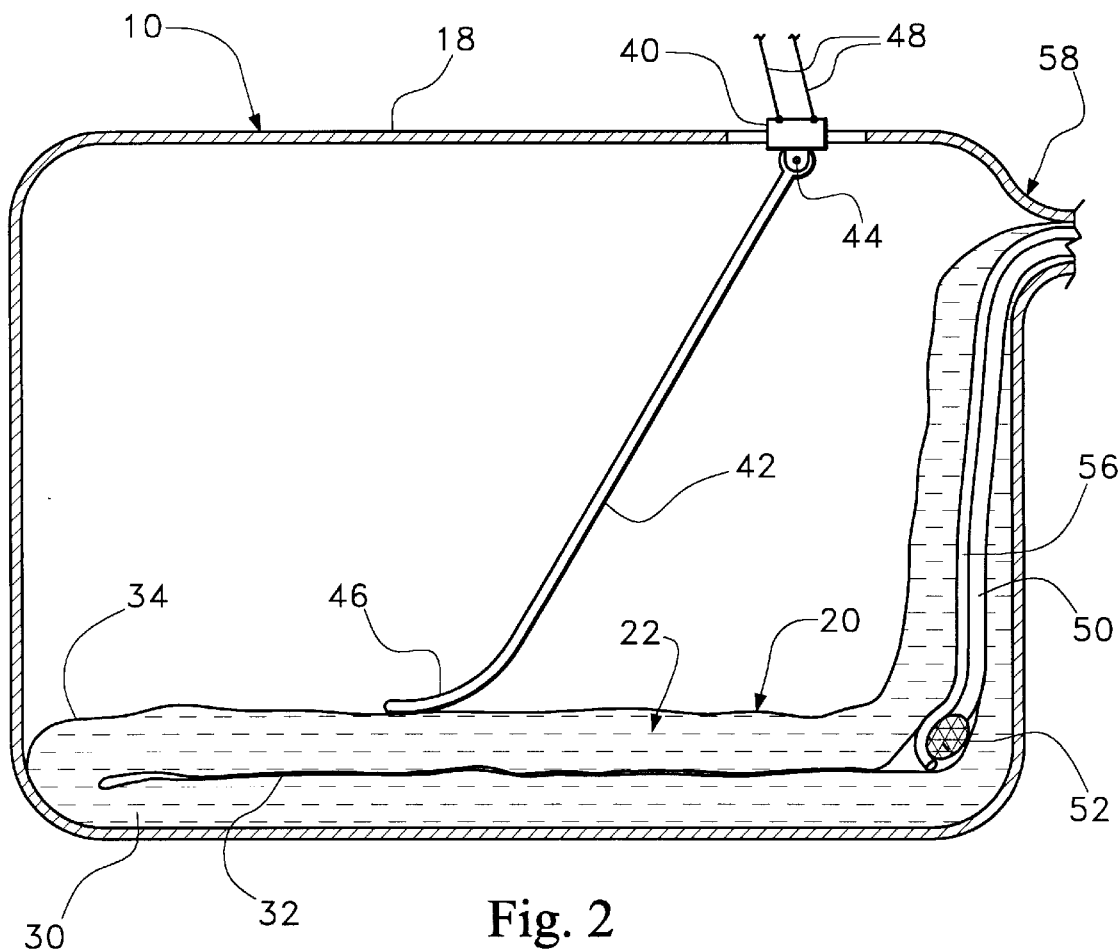
FIG. 2 is a partially diagrammatic cross-sectional view similar to FIG. 1, and showing another stage of operation.

Referring now to the drawing, and especially to FIGS. 1 and 2 thereof, a fuel tank assembly constructed in accordance with the present invention is shown generally at 10 and is shown containing a supply 12 of volatile fuel shown in the form of volume of liquid petroleum fuel 14 used in connection with the operation of an automotive vehicle (not shown) within which the fuel tank assembly 10 is installed. Fuel tank assembly 10 includes an outer housing illustrated in the form of a rigid cage-like housing member 18 constructed of metal or an essentially rigid molded synthetic polymeric material currently in common use for vehicle fuel tanks. A collapsible container 20 is placed within the housing member 18 and is surrounded by the housing member 18 so as to be protected against deleterious contact with objects outside the fuel tank assembly 10. Container 20 includes a highly compliant wall 22 movable readily between an expanded configuration, as shown in FIG. 1, wherein the capacity of the container has a maximum volume conforming to the supply 12 of fuel 14, and a collapsed configuration, as illustrated in FIG. 2, wherein the capacity of the container 20 is reduced to a minimum volume.

The highly compliant nature of wall 22 enables expansion and contraction of the volume of container 20 so as to conform the volume of the container 20 closely to the volume of the supply 12 of fuel 14 in the container 20, with essentially no extraneous volume within which fuel vapor can form as fuel either is withdrawn from the container 20 or is supplied to the container 20. Thus, the highly compliant and conformable quality of the wall 22 enables the wall 22 to conform directly and continuously to the volume of the supply 12 of fuel 14 as that volume is varied during use and replenishment of the fuel 14 in the container 20, between the expanded configuration seen in FIG. 1 and the collapsed configuration seen in FIG. 2, thus precluding contact of air with the fuel 14 and thereby deterring the formation of fuel vapor. To that end, wall 22 has a composite construction including a fluid filler material, shown in the form of a liquid filler 30 contained within a highly flexible envelope illustrated in the form of an inner element 32 within which the fuel 14 is contained, and an outer element 34 which surrounds the inner element 32 for containing the liquid filler 30 between the inner element 32 and the outer element 34.

Figure 3:
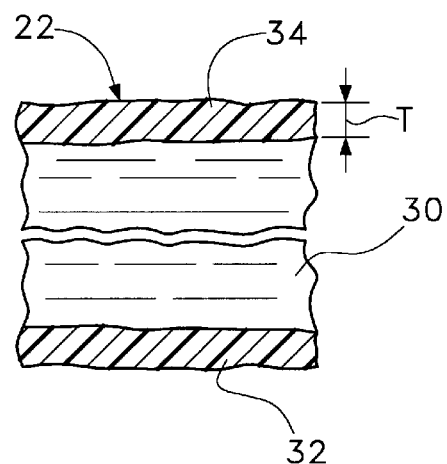
FIG. 3 is an enlarged fragmentary view of a portion of FIG. 1 indicated by the numeral 3 in FIG. 1.

As seen in FIG. 3, the inner element 32 is constructed of a relatively thin highly flexible synthetic polymeric material which is essentially impervious to the fuel 14 contained within the container 20 and the liquid filler 30. The outer element 34 is constructed of a relatively thin highly flexible synthetic polymeric material which is essentially impervious to the liquid filler 30, and preferably to the fuel 14, and is resistant to wear and abrasion resulting from contact with the housing member 18. A suitable material for both the inner element 32 and the outer element 34 is a flexible membrane material sold under the nomenclature VYTHENE by Fab-Seal Industrial Liners, Inc. and having a thickness T of about one-thirty-second of an inch. A wide variety of liquids are available for the liquid filler 30, with the preferred material being a readily available automotive engine oil such as Mobil 1 synthetic motor oil. As a safety measure, liquid filler 30 may include a fuel suppressant, such as that available commercially under the designation Purple K, so that in the event of a rupture or similar failure in the wall 22, fuel 14 will be rendered harmless. The combination of the relatively thin, highly flexible inner and outer elements 32 and 34 with the liquid filler 30 provides high compliance with sufficient weight to maintain wall 22 conformed to the volume of fuel 14 in the container 20 at all times during storage, withdrawal and replenishment of the fuel 14 in supply 12, thereby deterring any formation of fuel vapor within the container 20. In particular, the weight and flexibility provided by the composite construction of wall 22 assures that the wall 22 remains collapsed, in the collapsed configuration, without springing back toward the expanded configuration and drawing in ambient air which could form fuel vapor.

A fuel gage transducer 40 is mounted in the housing member 18 and a sensor arm 42 is mounted at one end of the sensor arm 42 for pivotal movement about a pivot point 44 to actuate the transducer 40 in response to pivotal movement of the sensor arm 42. A curved finger 46 adjacent the other end of the sensor arm 42 rides on the wall 22 of the container 20 and follows the wall 22 as the container 20 expands and collapses in response to the volume of fuel 14 in the container 20. The position of the sensor arm 42 is converted by the transducer 40 to a signal transmitted through leads 48 to a remote gage (not shown) to provide an indication of the amount of fuel 14 in the container 20 at any given time.

Fuel 14 is withdrawn from the supply 12 through flexible tubular fuel supply line 50 which carries a weighted filter screen in the form of a ball screen 52 at the terminal end 54 of the line 50 and is pumped to the vehicle engine (not shown) in a conventional manner. Excess fuel is returned to the supply 12 through a flexible tubular return line 56. Both the supply line 50 and the return line 56 extend through a neck 58 in the fuel tank assembly 10, as will be described in further detail below. A vent 60 is provided in the housing member 18 to facilitate the contraction and expansion of the container 20 as fuel 14 is withdrawn and replenished.

Figure 4:
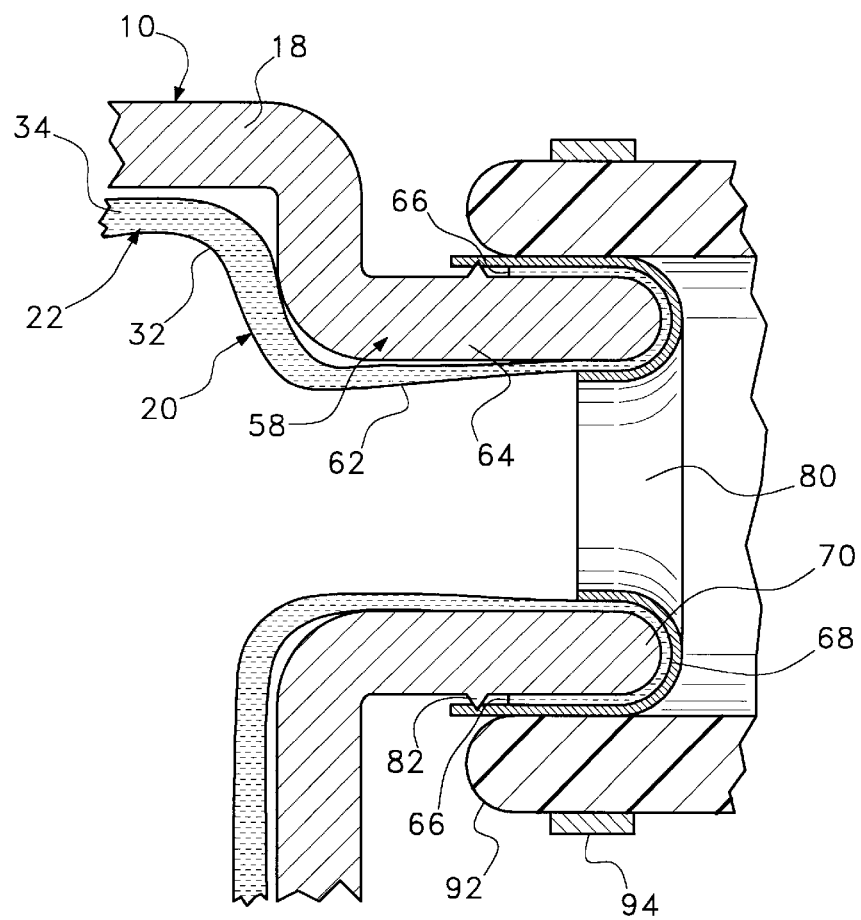
FIG. 4 is an enlarged fragmentary view of the neck of the fuel tank assembly.
Figure 5:
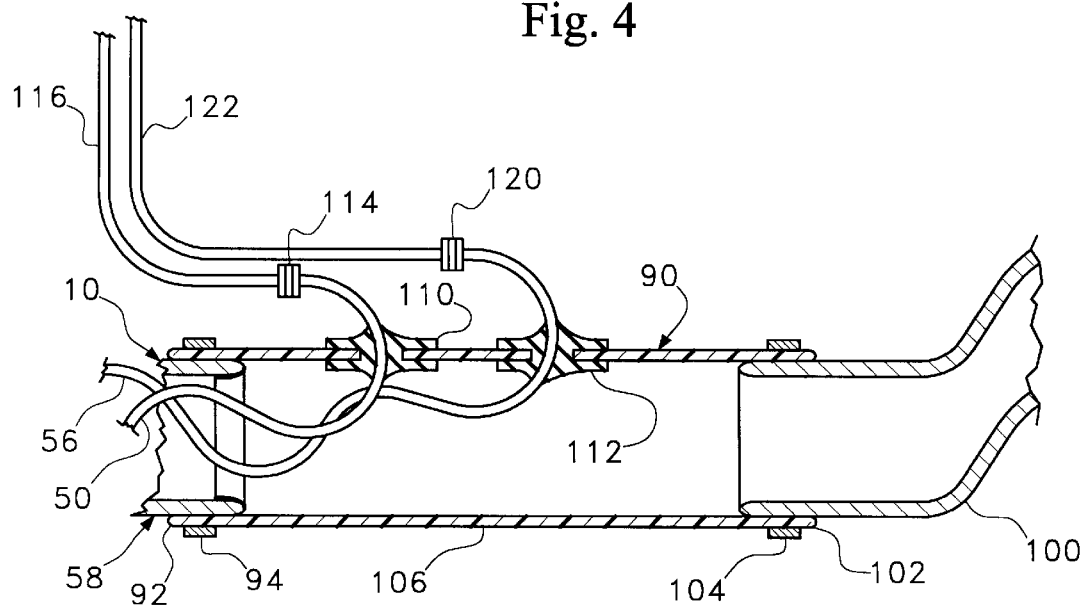
FIG. 5 is a less enlarged fragmentary view of the connection between the fuel tank assembly and a filler pipe of the vehicle within which the fuel tank assembly is placed.

Turning now to FIGS. 4 and 5, neck 58 of the fuel tank assembly 10 includes a sleeve-like extension 62 of the container 20 and a complementary sleeve-like extension 64 of the housing member 18. The inner and outer elements 32 and 34 of wall 22 are brought together at 66 and a portion 68 of the extension 62 is folded over a complementary portion 70 of extension 64. An annular retainer clip 80 is fitted tightly over the engaged portions 68 and 70 and is secured in place by engagement of the clip 80 with an annular ridge 82 integral with the extension 64 of the housing member 18. In this manner, the wall 22 of container 20 is integrated with the housing member 18 at the neck 58 of the fuel tank assembly 10.

As seen in FIG. 5, an intermediate connector pipe 90 connects the fuel tank assembly 10 with the vehicle within which the fuel tank assembly 10 is placed. Thus, neck 58 of the fuel tank assembly 10 is coupled to a first end 92 of the connector pipe 90 by means of a clamp 94 and filler pipe 100 of the vehicle is coupled to second end 102 of the connector pipe 90 by means of another clamp 104. The supply line 50 extends through the tubular wall 106 of the connector pipe 90 at an elastomeric seal 110 and the return line 56 extends through tubular wall 106 at another elastomeric seal 112. A first coupling 114 couples the supply line 50 to the vehicle fuel line 116 and a second coupling 120 couples the return line 56 to the vehicle return line 122. The vehicle fuel line 116 and the vehicle return line 122 are connected to the vehicle engine in a conventional manner. Preferably, connector pipe 90 is constructed of an electrically conductive synthetic polymeric material so as to suppress any static charges which otherwise could cause a spark in the fuel system of the vehicle.

It will be seen that the composite construction of the wall 22 of container 20 provides an essentially exclusive atmosphere of only fuel within the container 20. The conformance provided by the liquid filler 30, combined with the highly flexible inner and outer elements 32 and 34, assures that the wall 22 will follow the volume of fuel 14 in the supply 12 denying the entry of air into the container 20 and the concomitant formation of fuel vapor. By precluding contact between air and fuel 14 in the container 20, fuel vapor is not present and the problems connected with handling fuel vapors are eliminated.

Accordingly, the present invention attains the several objects and advantages summarized above, namely: Provides a fuel tank assembly with a container having a wall of highly compliant construction for deterring the formation of fuel vapor while the volume of fuel contained in the container is varied; enables greater safety through the elimination of the potential of explosion by deterring the formation of fuel vapor in vehicle fuel tanks; provides a relatively simple construction for a fuel tank which is effective in dealing with the problem of fuel vapor without prohibitive added expense; provides a fuel tank construction fully compatible with current vehicles and readily incorporated into such current vehicles for exemplary performance; enables exemplary performance over an extended service life.

It is to be understood that the above detailed description of a preferred embodiment of the invention is provided by way of example only. Various details of design and construction may be modified without departing from the true spirit and scope of the invention, as set forth in the appended claims.

The embodiments of the invention in which an exclusive property or privilege is claimed are defined as follows:

1. A fuel tank assembly for containing a supply of volatile fuel and deterring the formation of fuel vapor within the fuel tank assembly as fuel is withdrawn from and replenished to the supply in the fuel tank assembly, the fuel tank assembly comprising:

a collapsible container having a highly compliant wall movable between an expanded configuration and a collapsed configuration so as to follow and conform closely to the supply of volatile fuel within the container as the fuel is withdrawn from and replenished in the supply;

the wall having a composite construction including a fluid filler material contained within a highly flexible envelope such that the composite construction of the wall enables expansion of the container toward the expanded configuration in response to the replenishment of fuel in the container to conform to and contain the supply of volatile fuel, and enables collapse of the container in response to the withdrawal of fuel from the container, toward the collapsed configuration, with the wall continuously and closely conforming to the supply of fuel within the container as fuel is withdrawn from and replenished within the container, thereby deterring the formation of fuel vapor within the fuel tank assembly;

the fluid filler material comprising a liquid filler material.

2. The invention of claim 1 wherein the liquid filler material includes a fuel suppressant.

3. The invention of claim 1 wherein the liquid filler material comprises an oil.

4. The invention of claim 3 wherein the oil has a weight for facilitating the expansion and contraction of the container in response to replenishment and withdrawal of the fuel to and from the container.

5. The invention of claim 4 wherein the liquid filler material includes a fuel suppressant.

6. A fuel tank assembly for containing a supply of volatile fuel and deterring the formation of fuel vapor within the fuel tank assembly as fuel is withdrawn from and replenished to the supply in the fuel tank assembly, the fuel tank assembly comprising:

a collapsible container having a highly compliant wall movable between an expanded configuration and a collapsed configuration so as to follow and conform closely to the supply of volatile fuel within the container as the fuel is withdrawn from and replenished in the supply;

the wall having a composite construction including a fluid filler material contained within a highly flexible envelope such that the composite construction of the wall enables expansion of the container toward the expanded configuration in response to the replenishment of fuel in the container to conform to and contain the supply of volatile fuel, and enables collapse of the container in response to the withdrawal of fuel from the container, toward the collapsed configuration, with the wall continuously and closely conforming to the supply of fuel within the container as fuel is withdrawn from and replenished within the container, thereby deterring the formation of fuel vapor within the fuel tank assembly;

the highly flexible envelope including an inner member of highly flexible synthetic polymeric material for containing the supply of volatile fuel, and an outer member of highly flexible synthetic polymeric material surrounding the inner member for containing the fluid filler material between the inner and outer members;

the fluid filler material comprising a liquid filler material.

7. The invention of claim 6 wherein the liquid filler material comprises an oil.

8. The invention of claims 7 wherein the oil has a weight for facilitating the expansion and contraction of the container in response to replenishment and withdrawal of the fuel to and from the container.

9. The invention of claim 8 wherein the liquid filler material includes a fuel suppressant.

10. The invention of claim 1 wherein the fuel tank assembly includes an outer housing, and the collapsible container is placed within the outer housing.

11. The invention of claim 10 wherein the outer housing comprises a relatively rigid housing member surrounding the collapsible container.

12. The invention of claim 11 wherein the inner member is constructed of a highly flexible synthetic polymeric material, and the outer member is constructed of a highly flexible synthetic polymeric material.

13. A fuel tank assembly for containing a supply of volatile fuel and deterring the formation of fuel vapor within the fuel tank assembly as fuel is withdrawn from and replenished to the supply in the fuel tank assembly, the fuel tank assembly comprising:

a collapsible container having a highly compliant wall movable between an expanded configuration and a collapsed configuration so as to follow and conform closely to the supply of volatile fuel within the container as the fuel is withdrawn from and replenished in the supply;

the wall having a composite construction including a fluid filler material contained within a highly flexible envelope such that the composite construction of the wall enables expansion of the container toward the expanded configuration in response to the replenishment of fuel in the container to conform to and contain the supply of volatile fuel, and enables collapse of the container in response to the withdrawal of fuel from the container, toward the collapsed configuration, with the wall continuously and closely conforming to the supply of fuel within the container as fuel is withdrawn from and replenished within the container, thereby deterring the formation of fuel vapor within the fuel tank assembly;

the fuel tank assembly including an outer housing, and the collapsible container being placed within the outer housing, the outer housing comprising a relatively rigid housing member surrounding the collapsible container;

the highly flexible envelope including an inner member of highly flexible synthetic polymeric material for containing the supply of volatile fuel, and an outer member of highly flexible synthetic polymeric material surrounding the inner member for containing the fluid filler material between the inner and outer members;

the fluid filler material comprising a liquid filler material.

14. The invention of claim 13 wherein the liquid filler material comprises an oil.

15. The invention of claim 14 wherein the oil has a weight for facilitating the expansion and contraction of the container in response to replenishment and withdrawal of the fuel to and from the container.

16. The invention of claim 15 wherein the liquid filler material includes a fuel suppressant.

* * * * *